US012565546B2

(12) United States Patent
Kang et al.

(10) Patent No.: US 12,565,546 B2
(45) Date of Patent: Mar. 3, 2026

(54) IMINE GROUP-CONTAINING NOVEL COMPOUND, MODIFIED CONJUGATED DIENE-BASED POLYMER INCLUDING SAME, METHOD FOR PREPARING THE POLYMER, AND RUBBER COMPOSITION INCLUDING THE POLYMER

(71) Applicant: LG CHEM, LTD., Seoul (KR)

(72) Inventors: Suk Youn Kang, Daejeon (KR); Tae Chul Lee, Daejeon (KR); Dong Hui Kim, Daejeon (KR); Seo Won Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 905 days.

(21) Appl. No.: 17/769,846

(22) PCT Filed: Jul. 21, 2021

(86) PCT No.: PCT/KR2021/009369
§ 371 (c)(1),
(2) Date: Apr. 18, 2022

(87) PCT Pub. No.: WO2022/019628
PCT Pub. Date: Jan. 27, 2022

(65) Prior Publication Data

US 2022/0396648 A1 Dec. 15, 2022

(30) Foreign Application Priority Data

Jul. 22, 2020 (KR) ........................ 10-2020-0090962

(51) Int. Cl.

| | |
|---|---|
| ***C08F 8/32*** | (2006.01) |
| ***C07F 7/10*** | (2006.01) |
| ***C08F 4/52*** | (2006.01) |
| ***C08F 136/06*** | (2006.01) |
| ***C08K 3/04*** | (2006.01) |

(52) U.S. Cl.
CPC .................. *C08F 8/32* (2013.01); *C08F 4/52* (2013.01); *C08F 136/06* (2013.01); *C08K 3/04* (2013.01)

(58) Field of Classification Search
USPC .................................................. 525/102, 105
See application file for complete search history.

(56) References Cited

U.S. PATENT DOCUMENTS

| | | | | |
|---|---|---|---|---|
| 3,337,606 | A * | 8/1967 | Floyd | C08G 59/4042 528/121 |
| 2009/0186961 | A1 | 7/2009 | Araujo Da Silva et al. | |
| 2014/0303327 | A1 * | 10/2014 | McCauley | C08F 36/04 525/333.2 |
| 2018/0030070 | A1 | 2/2018 | Rossle et al. | |
| 2019/0071524 | A1 | 3/2019 | Kim et al. | |
| 2019/0077891 | A1 | 3/2019 | Nakatani et al. | |
| 2020/0399405 | A1 | 12/2020 | Kim et al. | |
| 2022/0056172 | A1 | 2/2022 | Kim et al. | |

FOREIGN PATENT DOCUMENTS

| | | | |
|---|---|---|---|
| JP | H09151275 | A | 6/1997 |
| JP | 2009-132870 | A | 6/2009 |
| JP | 2009-286822 | A | 12/2009 |
| JP | 5172663 | B2 | 3/2013 |
| JP | 2017-081849 | A | 5/2017 |
| JP | 2018-197199 | | 12/2018 |
| JP | 2019-522665 | A | 8/2019 |
| JP | 2019-151598 | | 9/2019 |
| KR | 10-2017-0101867 | A | 9/2017 |
| KR | 10-2017-0118794 | A | 10/2017 |
| KR | 10-2018-0047902 | A | 5/2018 |
| KR | 10-2018-0118764 | A | 10/2018 |
| KR | 10-2019-0059038 | A | 5/2019 |

OTHER PUBLICATIONS

Machine-generated English-language translation of Detailed Description of JP2017081849(A), 10 pages, retrieved from ESPACENET on Jan. 14, 2025. (Year: 2017).*
Valencia et al., "Bio-elastomers based on polyocimene synthesized via coordination polymerization using neodymium-based catalytic systems," RSC Adv., 2020, 10, 36539-36545. (Year: 2020).*
Zhong et al., Selective reversible protection of ethylenediamine for the synthesis of methacryl-based monomers, Polymer Bulletin, 28: 547-553 (1992).
Gutsulyak et al., "Chemoselective Catalytic Hydrosilylation of Nitriles," Angewandte Chemie, International Edition, 49: 7553-7556 (2010).
International Search Report (with partial English translation) and Written Opinion issued in corresponding International Patent Application No. PCT/KR2021/009369 dated Nov. 17, 2021.
Office Action issued in corresponding Japanese Patent Application No. 2022-523219, dated Apr. 18, 2023. JP 2018-197199, JP 2019-151598, JP 2017-081849, and article authored by Gutsulyak et al. cited therein were cited In an earlier-filed SB08.).

(Continued)

*Primary Examiner* — Fred M Teskin
(74) *Attorney, Agent, or Firm* — Morgan, Lewis & Bockius LLP

(57) ABSTRACT

Disclosed is an imine group-containing novel compound which is useful as a polymer modifier, a modified conjugated diene-based polymer including a functional group derived from the novel compound and having excellent affinity with a filler, a method for preparing the polymer, and a rubber composition including the polymer, and provides an imine group-containing compound represented by Formula 1, a modified conjugated diene-based polymer including a functional group derived therefrom, and a method for preparing the polymer.

Formula 1

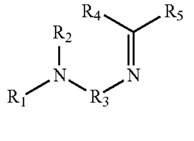

12 Claims, No Drawings

(56) References Cited

OTHER PUBLICATIONS

Extended European Search Report, dated Dec. 6, 2022, for the corresponding European Patent Application No. 21847332.0, 11 pages.
DATABASE REAXYS[Online] Jan. 1, 2017 (Jan. 1, 2017), Shin-Etsu Chemical Co. et al: "Method of Producing Imine Compound Having Bis-Silylamino Group", XP093001496.
DATABASE REAXYS[Online] Jan. 1, 2018 (Jan. 1, 2018), Shin-Etsu Chemical Co. et al: "The imine structure-containing cyclic organosilicon compound and method of manufacturing same", XP093001495.
DATABASE REAXYS[Online] Jan. 1, 2019 (Jan. 1, 2019), Shin-Etsu Chemical Co. et al: "The structure of the imine containing organoxysilane compound production", XP093001494.

* cited by examiner

IMINE GROUP-CONTAINING NOVEL COMPOUND, MODIFIED CONJUGATED DIENE-BASED POLYMER INCLUDING SAME, METHOD FOR PREPARING THE POLYMER, AND RUBBER COMPOSITION INCLUDING THE POLYMER

CROSS-REFERENCE TO RELATED APPLICATIONS

The present application claims the benefit of priority based on Korean Patent Application No. 10-2020-0090962, filed on Jul. 22, 2020, the entire contents of which are incorporated herein by reference.

TECHNICAL FIELD

Technical Field

The present invention relates to an imine group-containing novel compound, a modified conjugated diene-based polymer including a functional group derived therefrom and having excellent affinity with a filler, a method for preparing the polymer, and a rubber composition including the polymer.

Background Art

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based (co)polymers such as styrene-butadiene rubbers (hereinafter, referred to as “SBR”) and butadiene rubbers (hereinafter, referred to as “BR”), are prepared by emulsion polymerization or solution polymerization to be used as rubbers for tires.

In the case of using the BR or SBR as the rubber material for tires, a filler including silica or carbon black is generally blended together and used to obtain the physical properties required for tires. However, the affinity of the BR or SBR with the filler is not good, and there are problems in that the physical properties including abrasion resistance, crack resistance or processability are rather deteriorated.

Accordingly, as a method for improving the dispersibility of BR with a filler including silica or carbon black, a method of modifying a living active terminal with a specific modifier has been suggested in a living polymer obtained by coordination polymerization using a catalyst composition including a lanthanide rare earth element compound. However, in the case of a terminal modified polymer, the affinity with a filler is improved, and there are advantages of improving compounding properties, for example, tensile properties and viscoelasticity properties, but on the contrary, processability is largely degraded, and there are problems with poor processability.

In addition, in order to increase the affinity between SBR or BR with a filler during preparing a rubber composition by mixing SBR or BR with the filler such as silica and carbon black, a coupling agent having a functional group such as a silane group, an amine group and an azo group has been mixed together to increase the dispersibility of a filler to improve compounding properties and compounding processability, but improving effects of the compounding properties were not achieved.

PRIOR ART DOCUMENT (Patent Document 1) JP 5172663 B2

DISCLOSURE OF THE INVENTION

Technical Problem

The present invention has been devised to solve the above-mentioned problems of the conventional technique, and an object is to provide a novel compound useful as a polymer modifier, which includes an imine group in a molecule to introduce a functional group to a polymer through the reaction with a polymer active part, and which contains a group having affinity with a filler to improve the physical properties of the polymer.

In addition, an object of the present invention is to provide a modified conjugated diene-based polymer which includes a functional group derived from an imine group-containing novel compound and has improved compounding properties.

Also, an object of the present invention is to provide a method for preparing a modified conjugated diene-based polymer using an imine group-containing novel compound.

Further, an object of the present invention is to provide a rubber composition including the modified conjugated diene-based polymer.

Technical Solution

To solve the above-described tasks, the present invention provides an imine group-containing compound represented by the following Formula 1:

[Formula 1]

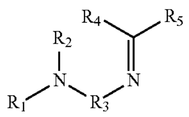

in Formula 1, $R_1$ is an alkyl group of 1 to 20 carbon atoms; or a mono-substituted, di-substituted or tri-substituted alkylsilyl group with an alkyl group of 1 to 20 carbon atoms, $R_2$ is an alkyl group of 1 to 20 carbon atoms; a mono-substituted, di-substituted or tri-substituted alkylsilyl group with an alkyl group of 1 to 20 carbon atoms; or a substituent represented by the following Formula 1a, $R_3$ is an alkylene group of 1 to 20 carbon atoms, wherein the alkylene group is unsubstituted or substituted with a substituent, $R_4$ is a hydrogen atom or an alkyl group of 1 to 20 carbon atoms, wherein the alkyl group is unsubstituted or substituted with a substituent, $R_5$ is an alkyl group of 1 to 20 carbon atoms, wherein the alkyl group is unsubstituted or substituted with a substituent, the substituent is an alkyl group of 1 to 10 carbon atoms, a cycloalkyl group of 3 to 10 carbon atoms, or an aryl group of 6 to 12 carbon atoms, and at least one among $R_1$ and $R_2$ is an alkylsilyl group,

[Formula 1a]

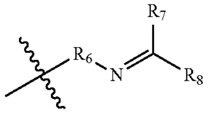

in Formula 1a, $R_6$ is an alkylene group of 1 to 20 carbon atoms, wherein the alkylene group is unsubstituted or substituted with a substituent, $R_7$ is a hydrogen atom or an alkyl group of 1 to 20 carbon atoms, wherein the alkyl group is unsubstituted or substituted with a substituent, $R_8$ is an alkyl group of 1 to 20 carbon atoms, wherein the alkyl group is unsubstituted or substituted with a substituent, and the substituent is an alkyl group of 1 to 10 carbon atoms, a cycloalkyl group of 3 to 10 carbon atoms, or an aryl group of 6 to 12 carbon atoms.

In addition, the present invention provides a modified conjugated diene-based polymer including: a repeating unit derived from a conjugated diene-based monomer; and a functional group derived from the imine group-containing compound represented by Formula 1.

Also, the present invention provides a method for preparing a modified conjugated diene-based polymer, including: polymerizing a conjugated diene-based monomer in the presence of a catalyst composition including a neodymium compound in a hydrocarbon solvent to prepare an active polymer (S1); and reacting the active polymer with an imine group-containing compound represented by the following Formula 1 (S2):

[Formula 1]

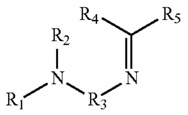

in Formula 1, $R_1$ is an alkyl group of 1 to 20 carbon atoms; or a mono-substituted, di-substituted or tri-substituted alkylsilyl group with an alkyl group of 1 to 20 carbon atoms, $R_2$ is an alkyl group of 1 to 20 carbon atoms; a mono-substituted, di-substituted or tri-substituted alkylsilyl group with an alkyl group of 1 to 20 carbon atoms; or a substituent represented by the following Formula 1a, $R_3$ is an alkylene group of 1 to 20 carbon atoms, wherein the alkylene group is unsubstituted or substituted with a substituent, $R_4$ is a hydrogen atom or an alkyl group of 1 to 20 carbon atoms, wherein the alkyl group is unsubstituted or substituted with a substituent, $R_5$ is an alkyl group of 1 to 20 carbon atoms, wherein the alkyl group is unsubstituted or substituted with a substituent, the substituent is an alkyl group of 1 to 10 carbon atoms, a cycloalkyl group of 3 to 10 carbon atoms, or an aryl group of 6 to 12 carbon atoms, and at least one among $R_1$ and $R_2$ is an alkylsilyl group,

[Formula 1a]

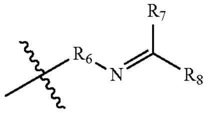

in Formula 1a, $R_6$ is an alkylene group of 1 to 20 carbon atoms, wherein the alkylene group is unsubstituted or substituted with a substituent, $R_7$ is a hydrogen atom or an alkyl group of 1 to 20 carbon atoms, wherein the alkyl group is unsubstituted or substituted with a substituent, $R_8$ is an alkyl group of 1 to 20 carbon atoms, wherein the alkyl group is unsubstituted or substituted with a substituent, and the substituent is an alkyl group of 1 to 10 carbon atoms, a cycloalkyl group of 3 to 10 carbon atoms, or an aryl group of 6 to 12 carbon atoms.

Further, the present invention provides a rubber composition including the modified conjugated diene-based polymer.

Advantageous Effects

The imine group-containing compound according to the present invention includes an imine group in a molecule, and has high reaction activity with a polymer active part to advantageously react with the polymer active part, and a functional group derived from the imine group-containing compound may be easily introduced into the polymer.

In addition, the modified conjugated diene-based polymer according to the present invention includes a functional group derived from the imine group-containing compound, particularly, a functional group having affinity with a filler such as carbon black, and may have excellent affinity with the filler.

Also, the method for preparing a modified conjugated diene-based polymer according to the present invention may easily prepare a modified conjugated diene-based polymer in which a functional group derived from the imine group-containing compound and having affinity with a filler through the reaction of an active polymer with an imine group in the imine group-containing compound by preparing an active polymer and reacting the active polymer with the imine group-containing compound.

Further, the rubber composition according to the present invention includes a modified conjugated diene-based polymer including a functional group derived from the imine group-containing compound, and accordingly, affinity between the polymer and a filler may become excellent, compounding properties may be improved, and abrasion resistance and rolling resistance may be excellent.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Definition

The term "substituted" used in the present invention may mean that the hydrogen of a functional group, an atomic group or a compound is substituted with a specific substituent. If the hydrogen of a functional group, an atomic group or a compound is substituted with a specific substituent, one or a plurality of substituents including two or more substituents may be present according to the number of hydrogen present in the functional group, the atomic group or the compound. In addition, if a plurality of substituents is present, each substituent may be the same or different.

The term "alkyl group" used in the present invention may mean monovalent aliphatic saturated hydrocarbon, and may include a linear alkyl group such as methyl, ethyl, propyl and butyl, and a branched alkyl group such as isopropyl, sec-butyl, tert-butyl and neo-pentyl.

The term "cycloalkyl group" in the present invention may mean cyclic saturated hydrocarbon.

The term "aryl group" used in the present invention may mean aromatic cyclic aromatic hydrocarbon, and may include both monocyclic aromatic hydrocarbon in which one ring is formed, or polycyclic aromatic hydrocarbon in which two or more rings are bonded.

The term "alkylene group" used in the present invention may mean a divalent aliphatic saturated hydrocarbon such as methylene, ethylene, propylene and butylene.

The terms "derived unit" and "derived functional group" used in the present invention may represent a component or a structure comes from a certain material, or the material itself.

Measurement Method

In the present invention, the "cis-1,4 bond content and the vinyl bond content" are obtained by measuring FT-IR transmittance spectrum of the carbon disulfide solution of a conjugated diene-based polymer that is prepared at a concentration of 5 mg/ml with carbon disulfide of the same cell as a blank, and using the maximum peak value around 1130 $cm^{-1}$ (a, base line), the minimum peak value around 967 $cm^{-1}$ (b) showing a trans-1,4 bond, the minimum peak value around 911 $cm^{-1}$ (c) showing a vinyl bond, and the minimum peak value around 736 $cm^{-1}$ (d) showing a cis-1,4 bond of the measured spectrum.

Imine Group-Containing Compound

The present invention provides a novel compound which may introduce a functional group into a polymer.

The imine group-containing compound according to an embodiment of the present invention is characterized in being a compound represented by the following Formula 1:

[Formula 1]

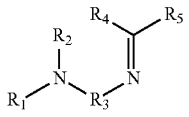

in Formula 1, $R_1$ is an alkyl group of 1 to 20 carbon atoms; or a mono-substituted, di-substituted or tri-substituted alkylsilyl group with an alkyl group of 1 to 20 carbon atoms, $R_2$ is an alkyl group of 1 to 20 carbon atoms; a mono-substituted, di-substituted or tri-substituted alkylsilyl group with an alkyl group of 1 to 20 carbon atoms; or a substituent represented by the following Formula 1a, $R_3$ is an alkylene group of 1 to 20 carbon atoms, wherein the alkylene group is unsubstituted or substituted with a substituent, $R_4$ is a hydrogen atom or an alkyl group of 1 to 20 carbon atoms, wherein the alkyl group is unsubstituted or substituted with a substituent, $R_5$ is an alkyl group of 1 to 20 carbon atoms, wherein the alkyl group is unsubstituted or substituted with a substituent, the substituent is an alkyl group of 1 to 10 carbon atoms, a cycloalkyl group of 3 to 10 carbon atoms, or an aryl group of 6 to 12 carbon atoms, and at least one among $R_1$ and $R_2$ is an alkylsilyl group,

[Formula 1a]

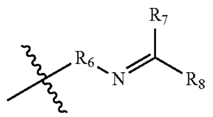

in Formula 1a, $R_6$ is an alkylene group of 1 to 20 carbon atoms, wherein the alkylene group is unsubstituted or substituted with a substituent, $R_7$ is a hydrogen atom or an alkyl group of 1 to 20 carbon atoms, wherein the alkyl group is unsubstituted or substituted with a substituent, $R_8$ is an alkyl group of 1 to 20 carbon atoms, wherein the alkyl group is unsubstituted or substituted with a substituent, and the substituent is an alkyl group of 1 to 10 carbon atoms, a cycloalkyl group of 3 to 10 carbon atoms, or an aryl group of 6 to 12 carbon atoms.

The imine group-containing compound according to an embodiment of the present invention may be a modifier modifying a polymer, particularly, a modifier for a conjugated diene-based polymer, and since an imine group is contained in a molecule, reaction activity with a polymer active part is high, and a functional group may be easily introduced by reacting with the polymer active part.

In addition, the imine group-containing compound contains a protected amine group in a molecule, and the protected amine group is introduced into a polymer molecule by the reaction of the imine group and the polymer active part, and after that, a protecting group is removed from the protected amine group to form a secondary amine which is a functional group having affinity with a filler such as carbon black, thereby improving the affinity of the polymer with the filler.

Particularly, in Formula 1, $R_1$ may be a mono-substituted, di-substituted or tri-substituted alkylsilyl group with an alkyl group of 1 to 10 carbon atoms, $R_2$ may be an alkyl group of 1 to 10 carbon atoms; or a substituent represented by Formula 1a, $R_3$ may be an unsubstituted alkylene group of 1 to 10 carbon atoms, $R_4$ may be an unsubstituted alkyl group of 1 to 10 carbon atoms, $R_5$ may be an unsubstituted alkyl group of 1 to 10 carbon atoms, and in Formula 1a, $R_6$ may be an unsubstituted alkylene group of 1 to 10 carbon atoms, $R_7$ may be an unsubstituted alkyl group of 1 to 10 carbon atoms, and $R_8$ may be an unsubstituted alkyl group of 1 to 10 carbon atoms.

More particularly, in Formula 1, $R_1$ may be a tri-substituted alkylsilyl group with an alkyl group of 1 to 6 carbon atoms, $R_2$ may be an alkyl group of 1 to 6 carbon atoms; or a substituent represented by Formula 1a, $R_3$ may be an unsubstituted alkylene group of 1 to 6 carbon atoms, $R_4$ and $R_5$ may be each independently an unsubstituted alkyl group of 1 to 6 carbon atoms, and in Formula 1a, $R_6$ may be an unsubstituted alkylene group of 1 to 6 carbon atoms, and $R_7$ and $R_8$ may be unsubstituted alkyl groups of 1 to 6 carbon atoms.

Further particularly, the imine group-containing compound represented by Formula 1 may be one or more selected from the compounds represented by Formulae 1-1 and 1-2 below.

[Formula 1-1]

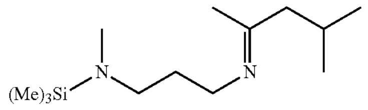

[Formula 1-2]

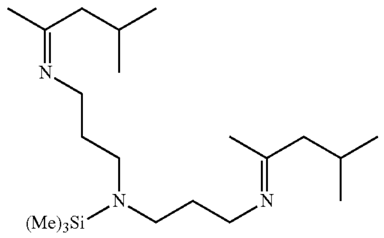

In Formula 1-1 and Formula 1-2, Me is a methyl group.

Modified Conjugated Diene-Based Polymer

The present invention provides a conjugated diene-based polymer having excellent affinity with a filler and excellent compounding properties by including a functional group derived from the imine group-containing compound represented by Formula 1.

The modified conjugated diene-based polymer according to an embodiment of the present invention is characterized in including a repeating unit derived from a conjugated diene-based monomer; and a functional group derived from the imine group-containing compound represented by Formula 1.

In addition, the modified conjugated diene-based polymer may be a butadiene homopolymer such as polybutadiene, or a diene-based copolymer such as a butadiene-isoprene copolymer.

In a particular embodiment, the modified conjugated diene-based polymer may include 80 to 100 wt % of a derived unit from a 1,3-butadiene monomer, and selectively, 20 wt % or less of a derived unit from other conjugated diene-based monomer which is copolymerizable with 1,3-butadiene, and within the ranges, effects of not degrading the 1,4-cis bond content in a polymer may be achieved. In this case, the 1,3-butadiene monomer may include 1,3-butadiene or the derivatives thereof such as 1,3-butadiene, 2,3-dimethyl-1,3-butadiene, and 2-ethyl-1,3-butadiene, and the other conjugated diene-based monomer which is copolymerizable with 1,3-butadiene may include 2-methyl-1,3-pentadiene, 1,3-pentadiene, 3-methyl-1,3-pentadiene, 4-methyl-1,3-pentadiene, 1,3-hexadiene or 2,4-hexadiene, and any one among them or a compound of two or more thereof may be used.

In addition, the modified conjugated diene-based polymer according to an embodiment of the present invention may be a neodymium-catalyzed modified conjugated diene-based polymer. That is, the modified conjugated diene-based polymer may be a conjugated diene-based polymer including an organometallic part which is activated from a catalyst composition including a neodymium compound.

In addition, the modified conjugated diene-based polymer according to an embodiment of the present invention may have a mooney viscosity (MV) at 100° C. of 20 to 100, particularly, 30 to 80, 35 to 75, or 40 to 70. The modified conjugated diene-based polymer according to the present invention has a mooney viscosity in the above-described range, and may have excellent processability.

In the present invention, the mooney viscosity was measured by using a mooney viscometer, for example, using Large Rotor of MV2000E of Monsanto Co. at a rotor speed of 2±0.02 rpm at 100° C. Particularly, a polymer was stood at room temperature (23±5° C.) for 30 minutes or more, and 27±3 g of the polymer was collected and put in a die cavity, and then, Platen was operated, and the mooney viscosity was measured while applying torque.

In addition, the modified conjugated diene-based polymer may have molecular weight distribution (Mw/Mn) of 2.0 to 3.5, more particularly, 2.5 to 3.5, 2.5 to 3.2, or 2.6 to 3.0.

In the present invention, the molecular weight distribution of the modified conjugated diene-based polymer may be calculated from the ratio (Mw/Mn) of the weight average molecular weight (Mw) to the number average molecular weight (Mn). In this case, the number average molecular weight (Mn) is a common average of the molecular weight of individual polymer, which is calculated by measuring the molecular weights of n polymer molecules, obtaining the total of the molecular weights, and dividing the total by n, and the weight average molecular weight (Mw) represents the molecular weight distribution of a polymer composition. All average molecular weights may be represented by gram per mole (g/mol). In addition, each of the weight average molecular weight and the number average molecular weight may mean a polystyrene converted molecular weight analyzed by gel permeation chromatography (GPC).

The modified conjugated diene-based polymer according to an embodiment of the present invention may satisfy the molecular weight distribution conditions described above and at the same time, may have a weight average molecular weight (Mw) of $3\times10^5$ to $1.5\times10^6$ g/mol, and a number average molecular weight (Mn) of $1.0\times10^5$ to $5.0\times10^5$ g/mol. Within these ranges, if applied to a rubber composition, tensile properties may be excellent, processability may be excellent, the workability of a rubber composition may be improved, mulling and kneading may become easy, and effects of excellent mechanical properties and balance of physical properties of the rubber composition may be achieved. The weight average molecular weight may be, for example, $5\times10^5$ to $1.2\times10^6$ g/mol, or $5\times10^5$ to $8\times10^5$ g/mol, and the number average molecular weight may be, for example, $1.5\times10^5$ to $3.5\times10^5$ g/mol, or $2.0\times10^5$ to $2.7\times10^5$ g/mol.

More particularly, if the modified conjugated diene-based polymer according to an embodiment of the present invention satisfies the weight average molecular weight (Mw) and the number average molecular weight conditions together with the molecular weight distribution, and if applied to a rubber composition, tensile properties, viscoelasticity and processability of the rubber composition are excellent, and effects of excellent balance between the physical properties are achieved.

In addition, the conjugated diene-based polymer may have the cis-1,4 bond content of a conjugated diene part, measured by Fourier transform infrared spectrometry (FT-IR) of 85 wt % or more, particularly, 90 wt % or more, more particularly, 95 wt % or more. Accordingly, if applied to a rubber composition, the abrasion resistance, crack resistance and ozone resistance of the rubber composition may be improved.

In addition, the modified conjugated diene-based polymer may have the vinyl content of a conjugated diene part, measured by Fourier transform infrared spectrometry of 5 wt % or less, more particularly, 2 wt % or less. If the vinyl content in the polymer is greater than 5 wt %, it is apprehended that the abrasion resistance, crack resistance and ozone resistance of a rubber composition including the same may be degraded.

Method for Preparing Modified Conjugated Diene-Based Polymer

In addition, the present invention provides a method for preparing the modified conjugated diene-based polymer.

The preparation method according to an embodiment of the present invention is characterized in including: polymerizing a conjugated diene-based monomer in the presence of a catalyst composition including a neodymium compound in a hydrocarbon solvent to prepare an active polymer (S1); and reacting the active polymer with the imine group-containing compound represented by Formula 1 (S2).

Step S1 is a step for polymerizing a conjugated diene-based monomer to prepare an active polymer including an organometallic part, and may be performed by polymerizing a conjugated diene-based monomer in the presence of a catalyst composition including a neodymium compound in a hydrocarbon solvent.

In the present invention, in the active polymer including the organometallic part, the organometallic part may be an activated organometallic part at the terminal of a conjugated diene-based polymer (activated organometallic part at the terminal or a molecular chain), an activated organometallic part in a main chain, or an activated organometallic part in a side chain (branched chain). Among them, if the activated organometallic part of a conjugated diene-based polymer is obtained by anionic polymerization or coordination anionic polymerization, the organometallic part may represent the activated organometallic part at the terminal.

The conjugated diene-based monomer is not specifically limited, but may be, for example, one or more selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene and 2,4-hexadiene.

The hydrocarbon solvent is not specifically limited, but may be one or more selected from the group consisting of n-pentane, n-hexane, n-heptane, isooctane, cyclohexane, toluene, benzene and xylene.

The catalyst composition may include a neodymium compound in 0.02 g to 1.0 g based on total 100 g of the conjugated diene-based monomer, and particularly, the neodymium compound may be used in 0.05 g to 0.5 g, more particularly, 0.05 g to 0.25 g based on total 100 g of the conjugated diene-based monomer.

The neodymium compound may include carboxylates thereof (e.g., neodymium acetate, neodymium acrylate, neodymium methacrylate, neodymium gluconate, neodymium citrate, neodymium fumarate, neodymium lactate, neodymium maleate, neodymium oxalate, neodymium 2-ethylhexanoate, neodymium neodecanoate, etc.); organophosphates thereof (e.g., neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, neodymium didecyl phosphate, etc.); organophosphonates thereof (e.g., neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, etc.); organophosphinates thereof (e.g., neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, etc.); carbamates thereof (e.g., neodymium dimethylcarbamate, neodymium diethylcarbamate, neodymium diisopropylcarbamate, neodymium dibutylcarbamate, neodymium dibenzylcarbamate, etc.); dithiocarbamates thereof (e.g., neodymium dimethyldithiocarbamate, neodymium diethyldithiocarbamate, neodymium diisopropyldithiocarbamate, neodymium dibutyldithiocarbamate, etc.); xanthates thereof (e.g., neodymium methylxanthate, neodymium ethylxanthate, neodymium isopropylxanthate, neodymium butylxanthate, neodymium benzylxanthate, etc.); β-diketonates thereof (e.g., neodymium acetylacetonate, neodymium trifluoroacetylacetonate, neodymium hexafluoroacetylacetonate, neodymium benzoylacetonate, etc.); alkoxides or aryloxides thereof (e.g., neodymium methoxide, neodymium ethoxide, neodymium isopropoxide, neodymium phenoxide, neodymium nonylphenoxide, etc.); halides or pseudo-halides thereof (e.g., neodymium fluoride, neodymium chloride, neodymium bromide, neodymium iodide, neodymium cyanide, neodymium cyanate, neodymium thiocyanate, neodymium azide, etc.); oxyhalides thereof (e.g., neodymium oxyfluoride, neodymium oxychloride, neodymium oxybromide, etc.); or organoneodymium-containing compounds including one or more neodymium-carbon bonds (e.g., $Cp_3Nd$, $Cp_2NdR$, $Cp_2NdCl$, $CpNdCl_2$, CpNtd (cyclooctatetraene), $(CsMe_5)_2NdR$, $NdR_3$, $Nd(allyl)_3$, $Nd(allyl)_2Cl$, etc., where R represents a hydrocarbyl group), and may include any one thereof or mixtures of two or more thereof.

The neodymium compound may be a compound represented by Formula 2 below.

[Formula 2]

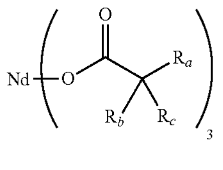

In Formula 2, $R_a$ to $R_c$ are each independently hydrogen or an alkyl group having 1 to 12 carbon atoms, where all $R_a$ to $R_c$ are not hydrogen at the same time.

More particularly, the neodymium compound may be one or more selected from the group consisting of Nd(2-ethylhexanoate)$_3$, Nd(2,2-dimethyl decanoate)$_3$, Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decaonate)$_3$, Nd(2-ethyl-2-butyl decanoate)$_3$, Nd(2-ethyl-2-hexyl decaoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decaonate)$_3$, Nd(2'-hexyl-2-octyl decanoate)$_3$, Nd(2,2-diethyl ocanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2'-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$, and Nd(2-ethyl-2-hexyl nonanoate)$_3$.

In addition, considering excellent solubility in a solvent without fear of oligomerization, a conversion ratio into a catalyst active species, and consequent excellent improving effects of catalyst activity, the neodymium compound may be Formula 2, where $R_a$ is an alkyl group of 4 to 12 carbon atoms, and $R_b$ and $R_c$ are each independently hydrogen or an alkyl group of 2 to 8 carbon atoms, where $R_b$ and $R_c$ are not hydrogen at the same time.

In a more particular embodiment, in Formula 2, $R_a$ may be an alkyl group of 6 to 8 carbon atoms, and $R_b$ and $R_c$ may be each independently hydrogen or an alkyl group of 2 to 6 carbon atoms, where $R_b$ and $R_c$ may not be hydrogen at the same time, and particular examples may be one or more selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2-t-butyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$, and Nd(2-ethyl-2-hexyl nonanoate)$_3$. Among them, the neodymium-based compound may be one or more selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, and Nd(2,2-dioctyl decanoate)$_3$.

More particularly, in Formula 2, $R_a$ may be an alkyl group of 6 to 8 carbon atoms, and $R_b$ and $R_c$ may be each independently an alkyl group of 2 to 6 carbon atoms.

As described above, if the neodymium-based compound represented by Formula 2 includes a carboxylate ligand including alkyl groups having diverse lengths of 2 or more carbon atoms as a substituent at an a (alpha) position, steric change is induced around a neodymium central metal to block flocculation phenomenon among compounds, and as a result, restraining effects of oligomerization may be achieved. In addition, such a neodymium-based compound has high solubility in a solvent, the ratio of neodymium positioned at the central part, which is difficult to transform into a catalyst active species, is reduced, and a conversion ratio into an active species is high.

In addition, the solubility of the neodymium compound according to an embodiment of the present invention may be about 4 g or more per 6 g of a nonpolar solvent at room temperature (25° C.).

In the present invention, the solubility of a neodymium-based compound means the degree of clear dissolution without turbid phenomenon, and by showing such a high solubility, excellent catalyst activity may be shown.

Also, the neodymium compound according to an embodiment of the present invention may be used in the form of a reactant with a Lewis base. The reactant may improve the solubility of the neodymium compound in a solvent due to the Lewis base and may be stored in a stable state for a long period of time. The Lewis base, for example, may be used in a ratio of 30 mol or less, or 1 to 10 mol per 1 mol of the neodymium element. Examples of the Lewis base may be acetylacetone, tetrahydrofuran, pyridine, N,N-dimethylformamide, thiophene, diphenyl ether, triethylamine, an organic phosphorus compound, or a monohydric or dihydric alcohol.

Meanwhile, the catalyst composition may further include at least one of an alkylating agent, a halide and a conjugated diene-based monomer together with the neodymium compound.

That is, the catalyst composition according to an embodiment of the present invention includes a neodymium compound and may further include at least one of an alkylating agent, a halide and a conjugated diene-based monomer.

Hereinafter, the (a) alkylating agent, (b) halide and (c) conjugated diene-based monomer will be separately explained in particular.

(a) Alkylating Agent

The alkylating agent is an organometallic compound which is capable of transporting a hydrocarbyl group to another metal, and may act as a co-catalyst. The alkylating agent may use any alkylating agents used for preparing a common diene-based polymer without limitation, and may be an organometallic compound soluble in a polymerization solvent and containing a metal-carbon bond, such as an organoaluminum compound, an organomagnesium compound, and an organolithium compound.

Particularly, the organoaluminum compound may include alkylaluminum such as trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, and trioctylaluminum; and dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride; hydrocarbylaluminum dihydride such as ethylaluminum dihydride, n-propylaluminum dihydride, isopropylaluminum dihydride, n-butylaluminum dihydride, isobutylaluminum dihydride, and n-octylaluminum dihydride, etc. The organomagnesium compound may include alkylmagnesium compound such as diethylmagnesium, di-n-propylmagnesium, diisopropylmagnesium, dibutylmagnesium, dihexylmagnesium, diphenylmagnesium, and dibenzylmagnesium, and the organolithium compound may include an alkyllithium compound such as n-butyllithium.

In addition, the organoaluminum compound may be aluminoxane.

The aluminoxane may be prepared by reacting a trihydrocarbylaluminum-based compound with water, and may particularly be linear aluminoxane of Formula 3a below or cyclic aluminoxane of Formula 3b below.

[Formula 3a]

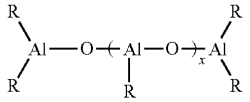

[Formula 3b]

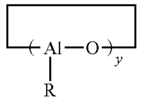

In Formulae 3a and 3b, R is a monovalent organic group bonded to an aluminum atom via a carbon atom, and may be a hydrocarbyl group, and x and y may be each independently an integer of 1 or more, particularly 1 to 100, more particularly 2 to 50.

More particularly, the aluminoxane may include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, or 2,6-dimethylphenylaluminoxane, and one or mixtures of two or more thereof may be used.

In addition, the modified methylaluminoxane may be one in which a methyl group of methylaluminoxane is substituted with a formula group (R), particularly, a hydrocarbon group having 2 to 20 carbon atoms, and may particularly be a compound represented by Formula 4 below.

[Formula 4]

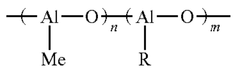

In Formula 4, R is the same as defined above, and m and n may be each independently an integer of 2 or more. Also, in Formula 4, Me represents a methyl group.

Particularly, in Formula 4, R may be an alkyl group of 2 to 20 carbon atoms, a cycloalkyl group of 3 to 20 carbon atoms, an alkenyl group of 2 to 20 carbon atoms, a cycloalkenyl group of 3 to 20 carbon atoms, an aryl group of 6 to 20 carbon atoms, an arylalkyl group of 7 to 20 carbon atoms, an alkylaryl group of 7 to 20 carbon atoms, an allyl group, or an alkynyl group of 2 to 20 carbon atoms, and may particularly be an alkyl group of 2 to 20 carbon atoms such as an ethyl group, an isobutyl group, a hexyl group and an octyl group, more particularly, an isobutyl group.

More particularly, the modified methylaluminoxane may be one in which about 50 mol % to 90 mol % of the methyl group of the methylaluminoxane is substituted with the above-described hydrocarbon group. If the amount of the hydrocarbon group substituted in the modified methylaluminoxane is within the above range, alkylation may be promoted to increase the catalyst activity.

Such a modified methylaluminoxane may be prepared by a common method, and may particularly be prepared using trimethylaluminum and an alkylaluminum other than the trimethylaluminum. In this case, the alkylaluminum may be triisobutylaluminum, triethylaluminum, trihexylaluminum, or trioctylaluminum, and any one thereof or mixtures of two or more thereof may be used.

In addition, the catalyst composition according to an embodiment of the present invention may include the alkylating agent in 1 to 200 molar ratio, particularly, 1 to 100 molar ratio, more particularly, 3 to 20 molar ratio based on 1 mol of the neodymium compound. If the alkylating agent is included in greater than 200 molar ratio, the control of catalyst reaction during preparing a polymer is not easy, and an excessive amount of the alkylating agent may induce side-reactions.

(b) Halide

The halide is not specifically limited, but may include, for example, a diatomic halogen, an interhalogen compound, hydrogen halide, an organic halide, a non-metal halide, a metal halide, or an organometallic halide, and any one thereof or mixtures of two or more thereof may be used. Among them, in consideration of catalyst activity enhancement and the resultant improving effects in reactivity, any one selected from the group consisting of an organic halide, a metal halide, and an organometallic halide, or mixtures of two or more thereof may be used as the halide.

The diatomic halogen may include fluorine, chlorine, bromine, or iodine.

In addition, the interhalogen compound may include iodine monochloride, iodine monobromide, iodine trichloride, iodine pentafluoride, iodine monofluoride, or iodine trifluoride.

In addition, the hydrogen halide may include hydrogen fluoride, hydrogen chloride, hydrogen bromide, or hydrogen iodide.

Also, the organic halide may include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzyliene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as 'iodoform'), tetraiodomethane, 1-iodopropane, 2-iodopropane, 1,3-diiodopropane, t-butyl iodide, 2,2-dimethyl-1-iodopropane (also referred to as 'neopentyl iodide'), allyl iodide, iodobenzene, benzyl iodide, diphenylmethyl iodide, triphenylmethyl iodide, benzylidene iodide (also referred to as 'benzal iodide'), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, and methyl iodoformate.

In addition, the non-metal halide may include phosphorous trichloride, phosphorous tribromide, phosphorous pentachloride, phosphorous oxychloride, phosphorous oxybromide, boron trifluoride, boron trichloride, boron tribromide, silicon tetrafluoride, silicon tetrachloride ($SiCl_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphorous triiodide, phosphorous oxyiodide, or selenium tetraiodide.

Also, the metal halide may include tin tetrachloride, tin tetrabromide, aluminum trichloride, aluminum tribromide, antimony trichloride, antimony pentachloride, antimony tribromide, aluminum trifluoride, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide, or magnesium diiodide.

Furthermore, the organometallic halide may include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, or di-t-butyl tin diiodide.

In addition, the catalyst composition according to an embodiment of the present invention may include the halide in 1 mol to 20 mol, more particularly, 1 mol to 5 mol, more particularly, 2 mol to 3 mol based on 1 mol of the neodymium compound. If the halide is included in greater than 20 molar ratio, the removal of the catalyst reaction is not easy, and an excessive amount of the halide may arise side-reactions.

In addition, the catalyst composition according to an embodiment of the present invention may include a non-coordinating anion-containing compound or a non-coordinating anion precursor compound instead of the halide or together with the halide.

Particularly, in the compound containing a non-coordinating anion, the non-coordinating anion is a sterically bulky anion that does not form a coordination bond with an active center of a catalyst system due to steric hindrance, and may be a tetraarylborate anion or a fluorinated tetraarylborate anion. In addition, the compound containing a non-coordinating anion may include a counter cation, for example, a carbonium cation such as a triarylcarbonium cation, an ammonium cation such as N,N-dialkyl anilinium cation, or a phosphonium cation, together with the above-described non-coordinating anion. More particularly, the compound containing a non-coordinating anion may include triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, or N,N-dimethylanilinium tetrakis[3,5-bis(trifluoromethyl)phenyl]borate.

Also, the non-coordinating anion precursor may include, as a compound capable of forming a non-coordinating anion under the reaction conditions, a triaryl boron compound ($BE_3$, where E is a strong electron-withdrawing aryl group such as a pentafluorophenyl group and a 3,5-bis(trifluoromethyl)phenyl group).

(c) Conjugated Diene-Based Monomer

Also, the catalyst composition may further include a conjugated diene-based monomer, and, since the catalyst composition is used in the form of a preforming or premix catalyst composition in which a portion of the conjugated diene-based monomer used in the polymerization reaction is pre-polymerized by being premixed with the catalyst composition for polymerization, catalyst composition activity may not only be improved, but an active polymer thus prepared may be stabilized.

In the present invention, the term "preforming" may denote that, in a case in which a catalyst composition including a neodymium compound, an alkylating agent, and a halide, that is, a catalyst system includes diisobutylaluminum hydride (DIBAH), a small amount of a conjugated diene-based monomer such as 1,3-butadiene, is added to reduce the possibility of producing various catalyst composition active species, and pre-polymerization is performed in the catalyst composition system with the addition of the 1,3-butadiene. Also, the term "premix" may denote a state in which each compound is uniformly mixed in the catalyst composition system without being polymerized.

In this case, with respect to the conjugated diene-based monomer used for the preparation of the catalyst composition, some amount within a total amount range of the conjugated diene-based monomer used in the polymerization reaction may be used, for example, in an amount of 1 mol to 100 mol, particularly, 10 mol to 50 mol, or 20 to 50 mol based on 1 mol of the neodymium compound.

The catalyst composition according to an embodiment of the present invention may be prepared by mixing at least one of the above-described neodymium compound, alkylating agent, halide and conjugated diene-based monomer, particularly, the neodymium compound, alkylating agent and halide, and selectively conjugated diene-based monomer in an organic solvent. In this case, the organic solvent may be a nonpolar solvent having no reactivity with the constituent components of the catalyst composition. Particularly, the nonpolar solvent may be a linear, branched or cyclic aliphatic hydrocarbon of 5 to 20 carbon atoms such as n-pentane, n-hexane, n-heptane, n-octane, n-nonane, n-decane, isopentane, isohexane, isopentane, isooctane, 2,2-dimethylbutane, cyclopentane, cyclohexane, methylcyclopentane and methylcyclohexane; a mixture solvent of an aliphatic hydrocarbon of 5 to 20 carbon atoms such as petroleum ether, petroleum spirits, and kerosene; or an aromatic hydrocarbon-based solvent such as benzene, toluene, ethylbenzene and xylene. Any one among them or mixtures of two or more thereof may be used. More particularly, the nonpolar solvent may be the linear, branched or cyclic aliphatic hydrocarbon of 5 to 20 carbon atoms or the mixture solvent of aliphatic hydrocarbon, more particularly, n-hexane, cyclohexane or a mixture thereof.

In addition, the organic solvent may be suitably selected according to the type of constituent components of the catalyst composition, particularly, the alkylating agent.

Particularly, since an alkyl aluminoxane such as methylaluminoxane (MAO) and ethylaluminoxane as the alkylating agent is not easily dissolved in an aliphatic hydrocarbon-based solvent, an aromatic hydrocarbon-based solvent may be suitably used.

In addition, in the case of using a modified methylaluminoxane as the alkylating agent, an aliphatic hydrocarbon-based solvent may be suitably used. In this case, a single solvent system may be accomplished together with an aliphatic hydrocarbon-based solvent such as hexane, which is mainly used as a polymerization solvent, and polymerization reaction may be more favorable. In addition, the aliphatic hydrocarbon-based solvent may promote catalyst activity, and by such a catalyst activity, reactivity may be improved even further.

Meanwhile, the organic solvent may be used in 20 mol to 20,000 mol, more particularly, 100 mol to 1,000 mol based on 1 mol of the neodymium compound.

Meanwhile, the polymerization of step 1 may be performed by continuous polymerization in a polymerization reactor including at least two reactors, or performed in a batch type reactor.

In addition, the polymerization may be a polymerization with heating, an isothermal polymerization, or a polymerization at a constant temperature (adiabatic polymerization).

Here, the constant temperature polymerization denotes a polymerization method including a step of performing polymerization not by optionally applying heat but with self-reaction heat after the catalyst composition is injected, the polymerization with heating denotes a polymerization method in which the temperature is elevated by optionally applying heat after the catalyst composition is injected, and the isothermal polymerization denotes a polymerization method in which the temperature of the polymer is constantly maintained by applying heat or taking away heat after the catalyst composition is injected.

In addition, the polymerization may be performed using coordination anionic polymerization, or performed by radical polymerization, particularly, bulk polymerization, solution polymerization, suspension polymerization or emulsion polymerization, more particularly, solution polymerization.

The polymerization may be performed in a temperature range of −20° C. to 200° C., particularly in a temperature range of 50° C. to 150° C., more particularly, 60° C. to 120° C., or 60° C. to 90° C. for 15 minutes to 3 hours. If the temperature during the polymerization is greater than 200° C., the sufficient control of polymerization reaction may be difficult, and it is apprehended that the cis-1,4 bond content of the conjugated diene-based polymer thus prepared is reduced, and if the temperature is less than −20° C., a polymerization reaction rate and efficiency may be deteriorated.

In addition, in the preparation method of the modified conjugated diene-based polymer according to an embodiment of the present invention, after preparing an active polymer, a step of terminating polymerization by further using an additive, for example, a reaction quenching agent for the completion of the polymerization reaction such as polyoxyethylene glycol phosphate; or an antioxidant such as 2,6-di-t-butylparacresol, may be further included. In addition, together with the reaction quenching agent, an additive that facilitates solution polymerization, for example, an additive such as a chelating agent, a dispersant, a pH controlling agent, a deoxidizer, and an oxygen scavenger, may be further selectively used.

Step S2 is a step of preparing a modified conjugated diene-based polymer including a functional group by modifying or coupling the active polymer, and may be performed by reacting the active polymer with an imine group-containing compound represented by Formula 1.

The imine group-containing compound may be used in 0.5 mol to 20 mol based on 1 mol of the neodymium compound in the catalyst composition. Particularly, the modifier may be used in 1 mol to 15 mol based on 1 mol of the neodymium compound in the catalyst composition, more particularly, 2 mol to 15 mol based on 1 mol of the neodymium compound in the catalyst composition.

In another embodiment, the imine group-containing compound may be used in 0.01 parts by weight to 2.00 parts by weight, particularly, 0.03 parts by weight to 1.00 part by weight or 0.05 parts by weight to 0.5 parts by weight based on 100 parts by weight of the conjugated diene-based compound.

In addition, the modification reaction may be performed at 0° C. to 90° C. for 1 minute to 5 hours.

After finishing the modification reaction, the polymerization reaction may be terminated by adding an isopropanol solution of 2,6-di-t-butyl-p-cresol (BHT) to a polymerization reaction system.

In the preparation method according to an embodiment of the present invention, after step S2, a modified conjugated diene-based polymer may be obtained through a desolvation treatment such as steam stripping in which a partial pressure of a solvent is reduced by supplying water vapor, or a vacuum drying treatment. Also, together with the modified conjugated diene-based polymer, an unmodified active polymer may be included in a reaction product obtained as a result of the above-described reaction.

Rubber Composition

Further, the present invention provides a rubber composition including the conjugated diene-based polymer and a molded product manufactured from the rubber composition.

The rubber composition according to an embodiment of the present invention may include the modified conjugated diene-based polymer in 0.1 wt % to 100 wt %, particularly, 10 wt % to 100 wt %, more particularly, 20 wt % to 90 wt %. If the amount of the modified conjugated diene-based polymer is less than 0.1 wt %, effects of improving the abrasion resistance and crack resistance of a resultant molded product manufactured by using the rubber composition, for example, a tire, may be insignificant.

Also, the rubber composition may further include other rubber components as necessary, in addition to the modified conjugated diene-based polymer, and in this case, the rubber component may be included in an amount of 90 wt % or less based on the total weight of the rubber composition. Particularly, the rubber component may be included in an amount of 1 to 900 parts by weight based on 100 parts by weight of the modified conjugated diene-based polymer.

The rubber component may be natural rubber or synthetic rubber, and, for example, the rubber component may be natural rubber (NR) including cis-1,4-polyisoprene; modified natural rubber such as an epoxidized natural rubber (ENR), deproteinized natural rubber (DPNR), and hydrogenated natural rubber, in which the general natural rubber is modified or purified; and synthetic rubber such as styrene-butadiene rubber (SBR), polybutadiene (BR), polyisoprene (IR), butyl rubber (IIR), an ethylene-propylene copolymer, polyisobutylene-co-isoprene, neoprene, poly(ethylene-copropylene), poly(styrene-co-butadiene), poly(styrene-co-isoprene), poly(styrene-co-isoprene-co-butadiene), poly (isoprene-co-butadiene), poly(ethylene-co-propylene-co-diene), polysulfide rubber, acrylic rubber, urethane rubber, silicon rubber, epichlorohydrin rubber, and halogenated butyl rubber. Any one thereof or mixtures of two or more thereof may be used.

In addition, the rubber composition may include 0.1 parts by weight to 150 parts by weight of a filler based on 100 parts by weight of the modified conjugated diene-based polymer, and the filler may include a silica-based filler, a carbon black filler, or a combination thereof. Particularly, the filler may be carbon black.

The carbon black-based filler is not specifically limited, but, for example, may have a nitrogen surface area per gram ($N_2SA$, measured according to JIS K 6217-2:2001) of 20 $m^2/g$ to 250 $m^2/g$. Also, the carbon black may have a dibutyl phthalate (DBP) oil absorption of 80 cc/100 g to 200 cc/100 g. If the nitrogen surface area per gram of the carbon black is greater than 250 $m^2/g$, processability of a rubber composition may be reduced, and, if the nitrogen surface area per gram of the carbon black is less than 20 $m^2/g$, reinforcement by carbon black may be insignificant. Furthermore, if the DBP oil absorption of the carbon black is greater than 200 cc/100 g, the processability of the rubber composition may be reduced, and, if the DBP oil absorption of the carbon black is less than 80 cc/100 g, the reinforcement by carbon black may be insignificant.

Also, the silica is not specifically limited, but, for example, may include wet silica (hydrous silicic acid), dry silica (anhydrous silicic acid), calcium silicate, aluminum silicate, or colloidal silica. Particularly, the silica may be wet silica in which an effect of improving both fracture characteristics and wet grip is the most significant. In addition, the silica may have a nitrogen adsorption surface area per gram ($N_2SA$) of 120 $m^2/g$ to 180 $m^2/g$, and a cetyltrimethylammonium bromide (CTAB) surface area per gram of 100 $m^2/g$ to 200 $m^2/g$. If the nitrogen surface area per gram of the silica is less than 120 $m^2/g$, reinforcement by silica may be reduced, and, if the nitrogen surface area per gram of the silica is greater than 180 $m^2/g$, the processability of a rubber composition may be degraded. Also, if the CTAB surface area per gram of the silica is less than 100 $m^2/g$, the reinforcement by silica, as the filler, may be degraded, and, if the CTAB surface area per gram of the silica is greater than 200 $m^2/g$, the processability of a rubber composition may be reduced.

Meanwhile if silica is used as the filler, a silane coupling agent may be used together for the improvement of reinforcement and low heat generation properties.

Particular examples of the silane coupling agent may be bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl) tetrasulfide, bis(2-trimethoxysilylethyl)tetrasulfide, 3-mercaptopropyl trimethoxysilane, 3-mercaptopropyl triethoxysilane, 2-mercaptoethyl trimethoxysilane, 2-mercaptoethyl triethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazolyl tetrasulfide, 3-triethoxysilylpropyl benzolyl tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyl dimethoxymethylsilane, dimethoxymethylsilylpropyl-N,N-dimethylthiocarbamoyl tetrasulfide, or dimethoxymethylsilylpropyl benzothiazolyl tetrasulfide, and any one thereof or mixtures of two or more thereof may be used. More particularly, in consideration of the effects of improving the reinforcement, the silane coupling agent may be bis(3-triethoxysilylpropyl)polysulfide or 3-trimethoxysilylpropyl benzothiazyl tetrasulfide.

Also, the rubber composition according to an embodiment of the present invention may be sulfur cross-linkable, and accordingly, may further include a vulcanizing agent.

The vulcanizing agent may particularly be a sulfur powder, and may be included in 0.1 to 10 parts by weight based on 100 parts by weight of the rubber component. If the vulcanizing agent is included within the above range, elastic modulus and strength required for a vulcanized rubber composition may be secured and simultaneously, a low fuel consumption ratio may be obtained.

In addition, the rubber composition according to an embodiment of the present invention may further include various additives, particularly, a vulcanization accelerator, a process oil, a plasticizer, an antiaging agent, a scorch inhibitor, zinc white, stearic acid, a thermosetting resin, or a thermoplastic resin, used in the general rubber industry, in addition to the above-described components.

The vulcanization accelerator is not specifically limited, but particularly, a thiazole-based compound such as 2-mercaptobenzothiazole (M), dibenzothiazyl disulfide (DM), and N-cyclohexylbenzothiazole-2-sulfenamide (CZ), or a guanidine-based compound such as diphenylguanidine (DPG) may be used. The vulcanization accelerator may be included in 0.1 parts by weight to 5 parts by weight based on 100 parts by weight of the rubber component.

Also, the process oil acts as a softener in the rubber composition, and particularly, the process oil may be a paraffin-based, naphthene-based, or aromatic compound, and more particularly, the aromatic process oil may be used in consideration of tensile strength and abrasion resistance, and the naphthene-based or paraffin-based process oil may be used in consideration of hysteresis loss and low temperature characteristics. The process oil may be included in an amount of 100 parts by weight or less based on 100 parts by weight of the rubber component, and if the process oil is included in the above amount, decreases in tensile strength and low heat generation property (low fuel consumption ratio) of the vulcanized rubber may be prevented.

In addition, the antiaging agent may particularly use N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a high-temperature condensate of diphenylamine and acetone. The antiaging agent may be used in 0.1 to 6 parts by weight based on 100 parts by weight of the rubber component.

The rubber composition according to an embodiment of the present invention may be obtained by kneading the above compounding prescription using a kneader such as a Banbury mixer, a roll, and an internal mixer, and a rubber composition having excellent abrasion resistance as well as low heat generation property may be obtained by a vulcanization process after molding.

Accordingly, the rubber composition may be useful for the manufacture of each member of a tire such as a tire's tread, an under tread, a sidewall, a carcass coating rubber, a belt coating rubber, a bead filler, a chafer, and a bead coating rubber, or various industrial rubber products such as an anti-vibration rubber, a belt conveyor, and a hose.

The molded product manufactured by using the rubber composition may include a tire or a tire's tread.

Hereinafter, the present invention will be explained in more detail referring to embodiments and experimental embodiments. However, embodiments and experimental embodiments below are for illustrating the present invention, and the scope of the present invention should not be limited thereto.

Preparation Example 1

In an ice bath, to a 250 ml, round bottom flask, 50 g of N-methylpropane-1,3-diamine was put, and 168 ml of 4-methyl-2-pentan-2-one was put for dissolving, followed by reacting at 130° C. for 5 hours. Then, the solvent was removed using a rotary evaporator to obtain an intermediate (88.8 g, yield: 92%).

To a 250 ml, round bottom flask, 88.8 g of the intermediate was put, and 100 ml of n-hexane and 106 ml of triethylamine were injected in order to dissolve the intermediate, and then, in an ice bath, 97 ml of chlorotrimethylsilane was slowly added dropwisely and reacted. The reaction was performed at room temperature for 6 hours, and the solvents were removed using a rotary evaporator. The resultant product was dissolved in hexane, the solvent was removed, filtering was performed, and the solvent was removed again to obtain a compound represented by Formula 1-1 below (95 g). By observing $^1H$ nuclear magnetic resonance spectrum, the formation of the compound of Formula 1-1 was identified.

[Formula 1-1]

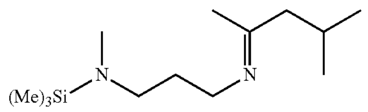

In Formula 1-1, Me is a methyl group.

$^1H$ NMR (500 MHz, $CDCl_3$) δ 2.53 (2H, t), 2.47 (3H, d), 2.22 (2H, d), 1.92 (2H, m), 1.76 (2H, m), 1.35 (2H, m), 1.27 (1H, m), 1.17 (6H, m), 0.02 (9H, s), 0.00 (18H, m).

Preparation Example 2

A compound represented by Formula 1-2 below was prepared by the same method as in Preparation Example 1 except for using 211 g of N-(3-aminopropyl)propane-1,3-diamine instead of N-methylpropane-1,3-diamine. By observing $^1H$ nuclear magnetic resonance spectrum, the formation of the compound of Formula 1-1 was identified.

[Formula 1-2]

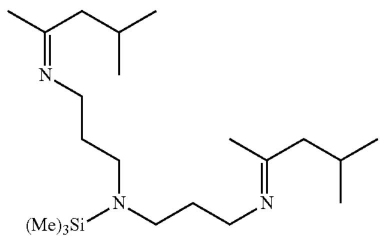

In Formula 1-2, Me is a methyl group.

$^1H$ NMR (500 MHz, $CDCl_3$) δ 2.60-2.55 (4H, m), 2.20-2.15 (4H, m), 2.01-1.95 (6H, m), 1.84-1.75 (2H, m), 1.70-1.64 (8H, m), 1.10-0.95 (12H, m), 0.07-0.01 (18H, m).

Example 1

To a 20 L, autoclave reactor, 900 g of 1,3-butadiene and 6,600 g of n-hexane were added, and the internal temperature of the reactor was elevated to 70° C. A catalyst composition was added thereto, and polymerization was performed for 60 minutes. In this case, the catalyst composition was prepared by adding neodymium versatate (Nd(2-ethylhexanoate)$_3$, Solvay Co.) in a n-hexane solvent, and injecting diisobutylaluminum hydride (DIBAH) and diethylalminum chloride (DEAC) in order in a molar ratio satisfying neodymium versatate:DIBAH:DEAC=1:16:2.4, and mixing. After adding the compound of Formula 1-1 prepared in Preparation Example 1, modification polymerization was performed at 70° C. for 30 minutes (amount used of modifier: 0.05 parts by weight based on 100 parts by weight of 1,3-butadiene). Then, a hexane solution including 1.0 g of a polymerization quenching agent and a solution in which 30 wt % of WINGSTAY (Eliokem SAS, France) as an antioxidant was dissolved in hexane were added to quench the reaction, and the polymer thus obtained was put in hot water heated with steam and stirred to remove solvents. Then, remaining solvents and water were removed by roll drying to prepare a modified butadiene polymer.

Example 2

A modified butadiene polymer was prepared through the same method as in Example 1 except for injecting 0.10 parts by weight of the compound of Formula 1-1 based on 100 parts by weight of 1,3-butadiene.

Example 3

A modified butadiene polymer was prepared through the same method as in Example 1 except for injecting the compound of Formula 1-2 prepared in Preparation Example 2 instead of the compound of Formula 1-1.

Comparative Example 1

A GND45 (LG CHEM) unmodified butadiene polymer was used as a comparative example.

Comparative Example 2

To a 20 L, autoclave reactor, 900 g of 1,3-butadiene and 6,600 g of n-hexane were added, and the internal temperature of the reactor was elevated to 70° C. A catalyst composition was added thereto, and polymerization was performed for 60 minutes. In this case, the catalyst composition was prepared by adding neodymium versatate (Nd(2-ethylhexanoate)$_3$, Solvay Co.) in a n-hexane solvent, and injecting diisobutylaluminum hydride (DIBAH) and diethylalminum chloride (DEAC) in order in a molar ratio satisfying neodymium versatate:DIBAH:DEAC=1:16:2.4, and mixing. Then, a hexane solution including 1.0 g of a polymerization quenching agent and a solution in which 30 wt % of WINGSTAY (Eliokem SAS, France) as an antioxidant was dissolved in hexane were added to quench the reaction, and the polymer thus obtained was put in hot water heated with steam and stirred to remove solvents. Then, remaining solvents and water were removed by roll drying to prepare an unmodified butadiene polymer.

Comparative Example 3

A modified butadiene polymer was prepared through the same method as in Example 1 except for injecting a compound of Formula a below instead of the compound of Formula 1-1.

[Formula a]

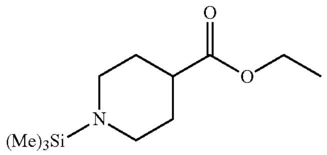

In Formula a, Me is a methyl group.

Experimental Example 1

With respect to the polymers of Examples 1 to 3 and Comparative Examples 1 to 3, physical properties were measured by the methods below, respectively, and the results are shown in Table 1 below.

1) Microstructure Analysis

The cis-1,4 bond content of a conjugated diene part was measured by Fourier transform infrared spectrometry (FT-IR).

Particularly, FT-IR transmittance spectrum of the carbon disulfide solution of a conjugated diene-based polymer that was prepared at a concentration of 5 mg/ml with carbon disulfide of the same cell as a blank, and using the maximum peak value around 1130 $cm^{-1}$ (a, base line), the minimum peak value around 967 $cm^{-1}$ (b) showing a trans-1,4 bond, the minimum peak value around 911 $cm^{-1}$ (c) showing a vinyl bond, and the minimum peak value around 736 $cm^{-1}$ (d) showing a cis-1,4 bond of the measured spectrum, each content was obtained.

2) Weight Average Molecular Weight (Mw), Number Average Molecular Weight (Mn), and Molecular Weight Distribution (MWD)

Each polymer was dissolved in tetrahydrofuran (THF) under conditions of 40° C. for 30 minutes, and then, loaded on gel permeation chromatography (GPC) and flown. In this case, two columns of PLgel Olexis (product name of Polymer Laboratories Co.) and one column of PLgel mixed-C (product name of Polymer Laboratories Co.) were used in combination. In addition, newly replaced columns were all mixed bed type columns, and polystyrene was used as a GPC standard material.

3) Mooney Viscosity (RP, Raw Polymer)

The mooney viscosity (ML1+4, @100° C.) was measured by using Large Rotor of MV-2000 of Monsanto Co. at rotor speed conditions of 2±0.02 rpm at 100° C. In this case, a specimen used was stood at room temperature (23±3° C.) for 30 minutes or more, and 27±3 g of the specimen was collected and put in a die cavity, and then, Platen was operated, and the mooney viscosity was measured while applying torque.

TABLE 1

| Division | | Example 1 | Example 2 | Example 3 | Comparative Example 1 | Comparative Example 2 | Comparative Example 3 |
|---|---|---|---|---|---|---|---|
| Micro-structure | Cis-1,4 bond content (wt %) | 95.6 | 95.8 | 96.0 | 96.8 | 96.9 | 94.9 |
| GPC results | Mn ($\times 10^5$ g/mol) | 2.40 | 2.53 | 2.51 | 2.46 | 2.63 | 2.57 |
| | Mw ($\times 10^5$ g/mol) | 6.01 | 5.94 | 6.19 | 6.15 | 6.29 | 5.94 |
| | MWD (Mw/Mn) | 2.50 | 2.35 | 2.47 | 2.50 | 2.39 | 2.31 |
| Mooney viscosity (RP) (ML1 + 4, @100° C.) (MU) | | 38.9 | 41.5 | 48.6 | 43.0 | 47.5 | 48.1 |

As shown in Table 1 above, it was confirmed that all the modified butadiene polymers of Examples 1 to 3 showed the high cis 1,4-bond content of 85 wt % or more.

Experimental Example 2

Rubber compositions and rubber specimens were formed using the polymers of Examples 1 to 3 and Comparative Examples 1 to 3, and mooney viscosity, tensile stress, 300% modulus, abrasion resistance and viscoelasticity properties were measured, respectively, and the results are shown in Table 2 below.

Particularly, with respect to 100 parts by weight of each polymer, 70 parts by weight of carbon black, 22.5 parts by weight of a process oil, 2 parts by weight of an antiaging agent, 3 parts by weight of zinc oxide (ZnO), and 2 parts by weight of stearic acid were compounded to prepare each rubber composition. Then, to each rubber composition, 2 parts by weight of sulfur, 2 parts by weight of a vulcanization accelerator (CZ), and 0.5 parts by weight of a vulcanization accelerator (DPG) were added and gently mixed at 50° C. for 1.5 minutes at 50 rpm and then, a vulcanized mixture compound in a sheet shape was obtained using a roll of 50° C. The vulcanized mixture compound was vulcanized at 160° C. for 25 minutes to prepare a rubber specimen.

2) Tensile Stress and 300% Modulus

After vulcanizing each rubber composition at 150° C. for t90 minutes, tensile stress of a vulcanized product, and modulus when elongated by 300% (M-300%) were measured according to ASTM D412.

3) Abrasion Resistance (DIN Abrasion Test)

For each rubber specimen, DIN abrasion test was performed based on ASTM D5963, and DIN loss index (loss volume index): abrasion resistance index (ARIA, Method A) is shown.

4) Viscoelasticity Properties

Tan δ properties, which are the most important for a low fuel consumption properties, were obtained by measuring a viscoelasticity coefficient (Tan δ) at −60° C.-60° C. with a frequency of 10 Hz, a prestrain of 3% and a dynamic strain of 3% by using DMTS 500N of Gabo Co. in Germany. In this case, the Tan δ value at 60° C. represents rolling resistance properties (fuel consumption ratio), and a low measured value means excellent results.

TABLE 2

| Division | | Example 1 | Example 2 | Example 3 | Comparative Example 1 | Comparative Example 2 | Comparative Example 3 |
|---|---|---|---|---|---|---|---|
| Tensile properties | M-300% ($kgf/cm^2$) | 108 | 111 | 115 | 97 | 92 | 98 |
| | Tensile stress ($kgf/cm^2$) | 467 | 476 | 468 | 499 | 503 | 463 |
| Abrasion resistance | | 111 | 111 | 107 | 101 | 100 | 106 |
| Viscoelasticity properties | Tan δ at 60° C. | 0.140 | 0.141 | 0.139 | 0.173 | 0.175 | 0.151 |
| | Index (%) | 125 | 124 | 126 | 101 | 100 | 115 |

In Table 2, the resultant values of the abrasion resistance of Examples 1 to 3 and Comparative Examples 1 to 3 were calculated and indexed by Mathematical Formula 2 below based on the measured value of Comparative Example 2, and the Tan δ value at 60° C. was calculated and indexed by Mathematical Formula 3 below.

Index=(measured value/standard value)×100 [Mathematical Formula 2]

Index=(standard value/measured value)×100 [Mathematical Formula 3]

As shown in Table 2 above, it was confirmed that Examples 1 to 3 showed excellent tensile properties and markedly improved abrasion resistance and rolling resistance in contrast to Comparative Examples 1 to 3.

Particularly, Examples 1 to 3 showed markedly improved 300% modulus by about 17% to 25% and at the same time, markedly improved abrasion resistance by 7% to 11% and rolling resistance by 24% to 26% in contrast to Comparative Example 2. In this case, Comparative Example 2 corresponds to an unmodified butadiene polymer prepared by the same method as in Example 1 except for unmodifying by the imine group-containing compound suggested in the present invention.

In addition, Examples 1 to 3 showed improved abrasion resistance and rolling resistance and markedly improved 300% modulus by about 10% to 17% in contrast to Comparative Example 3. Here, Comparative Example 3 corresponds to a modified butadiene polymer modified by a common other modifier including a protected imine group and an ester group.

From the results, it could be confirmed that excellent effects of improving the physical properties of the polymer may be achieved by applying the imine group-containing compound represented by Formula 1 of the present invention as a modifier, and it could be confirmed that the modified conjugated diene-based polymer according to the present invention includes a functional group derived from the imine group-containing compound and shows excellent effects of tensile properties, abrasion resistance and rolling resistance in balance.

The invention claimed is:

1. An imine group-containing compound represented by the following Formula 1:

[Formula 1]

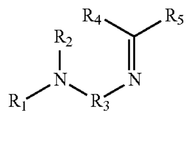

wherein in Formula 1, $R_1$ is a mono-substituted, di-substituted or tri-substituted alkylsilyl group, wherein the alkyl group has 1 to 20 carbon atoms, $R_2$ is an alkyl group having 1 to 20 carbon atoms; or a substituent represented by the following Formula 1a, $R_3$ is an alkylene group having 1 to 20 carbon atoms, wherein the alkylene group is unsubstituted or substituted with a substituent, $R_4$ is a hydrogen atom or an alkyl group having 1 to 20 carbon atoms, wherein the alkyl group is unsubstituted or substituted with a substituent, $R_5$ is an alkyl group having 1 to 20 carbon atoms, wherein the alkyl group is unsubstituted or substituted with a substituent, and the substituent is an alkyl group having 1 to 10 carbon atoms, a cycloalkyl group having 3 to 10 carbon atoms, or an aryl group having 6 to 12 carbon atoms,

[Formula 1a]

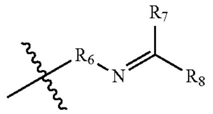

wherein in Formula 1a, $R_6$ is an alkylene group having 1 to 20 carbon atoms, wherein the alkylene group is unsubstituted or substituted with a substituent, $R_7$ is a hydrogen atom or an alkyl group having 1 to 20 carbon atoms, wherein the alkyl group is unsubstituted or substituted with a substituent, $R_8$ is an alkyl group having 1 to 20 carbon atoms, wherein the alkyl group is unsubstituted or substituted with a substituent, and the substituent is an alkyl group of 1 to 10 carbon atoms, a cycloalkyl group having 3 to 10 carbon atoms, or an aryl group having 6 to 12 carbon atoms.

2. The imine group-containing compound of claim 1, wherein, in Formula 1, $R_1$ is a mono-substituted, di-substituted or tri-substituted alkylsilyl, wherein the alkyl group has 1 to 10 carbon atoms, $R_2$ is an alkyl group having 1 to 10 carbon atoms; or a substituent represented by Formula 1a, $R_3$ is an unsubstituted alkylene group having 1 to 10 carbon atoms, $R_4$ is an unsubstituted alkyl group having 1 to 10 carbon atoms, $R_5$ is an unsubstituted alkyl group having 1 to 10 carbon atoms, and in Formula 1a, $R_6$ is an unsubstituted alkylene group having 1 to 10 carbon atoms, $R_7$ is an unsubstituted alkyl group having 1 to 10 carbon atoms, and $R_8$ is an unsubstituted alkyl group having 1 to 10 carbon atoms.

3. The imine group-containing compound of claim 1, wherein the compound represented by Formula 1 is one or more selected from compounds represented by the following Formulae 1-1 and 1-2:

[Formula 1-1]

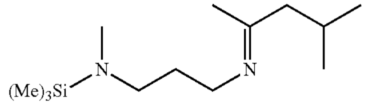

[Formula 1-2]

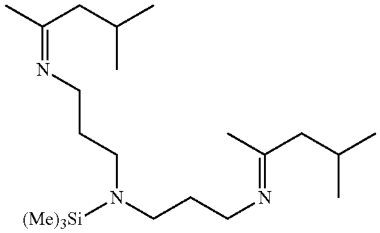

wherein in Formula 1-1 and Formula 1-2, Me is a methyl group.

4. A modified conjugated diene-based polymer comprising:

a repeating unit derived from a conjugated diene-based monomer; and a functional group derived from the imine group-containing compound represented by Formula 1 in claim 1.

5. The modified conjugated diene-based polymer of claim 4, wherein the conjugated diene-based polymer has a cis-1,4 bond content and a vinyl bond content, wherein the cis-1,4 bond content is 85% or more and the vinyl bond content is 5% or less.

6. The modified conjugated diene-based polymer of claim 4, wherein the imine group-containing compound represented by Formula 1 is one or more selected from compounds represented by the following Formulae 1-1 and 1-2:

[Formula 1-1]

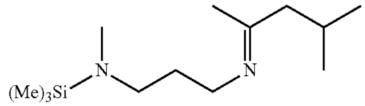

[Formula 1-2]

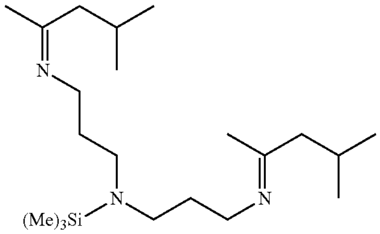

wherein in Formula 1-1 and Formula 1-2, Me is a methyl group.

7. A method for preparing a modified conjugated diene-based polymer, the method comprising:

1) Polymerizing a conjugated diene-based monomer in the presence of a catalyst composition comprising a neodymium compound in a hydrocarbon solvent to prepare an active polymer; and 2) reacting the active polymer with an imine group-containing compound represented by the following Formula 1:

[Formula 1]

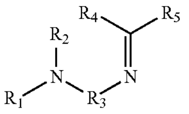

wherein in Formula 1, $R_1$ is a mono-substituted, di-substituted or tri-substituted alkylsilyl group, wherein the alkyl group has 1 to 20 carbon atoms, $R_2$ is an alkyl group having 1 to 20 carbon atoms; or a substituent represented by the following Formula 1a, $R_3$ is an alkylene group having 1 to 20 carbon atoms, wherein the alkylene group is unsubstituted or substituted with a substituent, $R_4$ is a hydrogen atom or an alkyl group having 1 to 20 carbon atoms, wherein the alkyl group is unsubstituted or substituted with a substituent, $R_5$ is an alkyl group having 1 to 20 carbon atoms, wherein the alkyl group is unsubstituted or substituted with a substituent, and the substituent is an alkyl group having 1 to 10 carbon atoms, a cycloalkyl group having 3 to 10 carbon atoms, or an aryl group having 6 to 12 carbon atoms,

[Formula 1a]

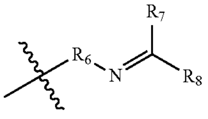

wherein in Formula 1a, $R_6$ is an alkylene group having 1 to 20 carbon atoms, wherein the alkylene group is unsubstituted or substituted with a substituent, $R_7$ is a hydrogen atom or an alkyl group having 1 to 20 carbon atoms, wherein the alkyl group is unsubstituted or substituted with a substituent, $R_8$ is an alkyl group having 1 to 20 carbon atoms, wherein the alkyl group is unsubstituted or substituted with a substituent, and the substituent is an alkyl group of 1 to 10 carbon atoms, a cycloalkyl group having 3 to 10 carbon atoms, or an aryl group having 6 to 12 carbon atoms.

8. The method for preparing a modified conjugated diene-based polymer of claim 7, wherein the catalyst composition comprises the neodymium compound in an amount of 0.1 mmol to 0.5 mmol based on 100 g of the conjugated diene-based monomer.

9. The method for preparing a modified conjugated diene-based polymer of claim 7, wherein the neodymium compound is a compound represented by the following Formula 2:

[Formula 2]

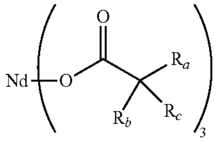

wherein in Formula 2, $R_a$ to $R_c$ are each independently a hydrogen atom, or an alkyl group having 1 to 12 carbon atoms, where $R_a$ to $R_c$ are not hydrogen atoms, simultaneously.

10. The method for preparing a modified conjugated diene-based polymer of claim 7, wherein the amount of imine group-containing compound represented by Formula 1 is in a ratio of 0.5 mol to 20 mol based on 1 mol of the neodymium compound.

11. A rubber composition comprising the modified conjugated diene-based polymer of claim 4, and a filler.

12. The rubber composition of claim 11, wherein the filler is carbon black.

* * * * *